United States Patent [19]

Flynn et al.

[11] Patent Number: 4,978,716
[45] Date of Patent: Dec. 18, 1990

[54] THERMOPLASTIC ELASTOMERS BASED UPON CHLORINATED POLYETHYLENE AND A CRYSTALLINE OLEFIN POLYMER

[75] Inventors: James H. Flynn; Oliver C. Ainsworth, both of Baton Rouge; Robert R. Blanchard, Brusly, all of La.

[73] Assignee: The Dow Chemical Company, Midland, Mich.

[21] Appl. No.: 453,880

[22] Filed: Dec. 11, 1989

Related U.S. Application Data

[62] Division of Ser. No. 178,750, Apr. 7, 1988, Pat. No. 4,910,245.

[51] Int. Cl.$^5$ .................... C08L 23/26; C08L 23/28
[52] U.S. Cl. .................... 525/195; 525/192; 525/194; 525/197; 524/528
[58] Field of Search .................... 525/192, 194, 195; 324/298

[56] References Cited

U.S. PATENT DOCUMENTS

| | | | |
|---|---|---|---|
| 4,128,510 | 12/1978 | Richwine | 528/36 |
| 4,141,878 | 2/1979 | Coran et al. | 525/240 |
| 4,288,576 | 9/1981 | Richwine | 525/349 |
| 4,503,192 | 3/1985 | McShane et al. | 525/194 |

OTHER PUBLICATIONS

Coran et al, "Rubber-Thermoplastic Compositions", Part 5, Selecting Polymers for Thermoplastic Vulcanization, 1981, vol. 55-Rub. Chem. & Tech., pp. 116–136.
"Materials and Compounding Ingredients for Rubber", 5/75-Rubber World, p 179.

Primary Examiner—Carman J. Seccuro

[57] ABSTRACT

Thermoplastic vulcanizates are prepared by curing, at least partially by dynamic vulcanization, blends of chlorinated polyethylene and crystalline thermoplastic polymers such as polypropylene. Inclusion of a plasticizing material or extender oil, e.g. trioctyl trimellitate, enhances softness and oil resistance of the blends. Vulcanizing materials include a basic material, normally added with the chlorinated polyethylene, and (1) a derivative of 2,5-dimercapto-1,3,4-thiadiazole or (2) a combination of 2,5-dimercapto-1,3,4-thiadizaole and an activator material such as an amine having a boiling point of 110° C. or higher and a pk value less than 4.5.

20 Claims, No Drawings

THERMOPLASTIC ELASTOMERS BASED UPON CHLORINATED POLYETHYLENE AND A CRYSTALLINE OLEFIN POLYMER

CROSS-REFERENCE TO RELATED APPLICATION

This is a divisional of application Ser. No. 07/178,750 filed Apr. 7, 1988 now U.S. Pat. No. 4,910,245.

BACKGROUND OF THE INVENTION

The present invention generally concerns thermoplastic elastomer compositions comprising blends of chlorinated polyethylene and a crystalline olefin polymer. The present invention also concerns preparation of said compositions by dynamic vulcanization or by a sequential combination of dynamic vulcanization and static curing. Static curing may occur, for example in a heated oven. The present invention further concerns the use of a non-peroxide cure package to accomplish said dynamic vulcanization.

Thermoplastic elastomers, which can be processed and fabricated by methods used for thermoplastics and do not require vulcanization to develop elastomeric properties, are known (see, for example, U.S. Pat. No. 3,265,765 as well as Hartman et al., "Butyl Grafted to Polyethylene Yields Thermoplastic Elastomer," Rubber World, Oct. 1970, pp. 59–64).

Dynamic vulcanization is a process whereby a blend of plastic, rubber and rubber curative is masticated while curing the rubber. The term "dynamic" indicates the mixture is subjected to shear forces during the vulcanization step as contrasted with "static" vulcanization wherein the vulcanizable composition is immobile (in fixed relative space) during vulcanization. One advantage of dynamic vulcanization is that elastoplastic (thermoplastic elastomeric) compositions may be obtained when the blend contains the proper proportions of plastic and rubber. Dynamic vulcanization processes are described in U.S. Pat. Nos. 3,037,954, 3,806,558, 4,104,210, 4,116,914, 4,130,535, 4,141,863, 4,141,878, 4,173,556, 4,207,404, 4,271,049, 4,287,324, 4,288,570, 4,299,931, 4,311,628 and 4,338,413.

Known dynamic vulcanization processes are believed to be somewhat unsuitable for making soft compositions because as the rubber level rises the resulting compositions become less fabricable. In other words, the compositions give poor extrudates and, sometimes, cannot be extruded at all. Accordingly, there is a need for processes for preparing soft, extrusion-fabricable, thermoplastic elastomeric compositions.

U.S. Pat. No. 4,130,535 discloses thermoplastic vulcanizates or blends of polyolefin resin and monoolefin copolymer rubber which are processable in the same manner as thermoplastics even though the rubber is fully cured. The thermoset state is avoided by simultaneously masticating and curing the blends. The blends comprise about 25–95 percent by weight of the resin and about 75–5 percent by weight of the rubber. Oil extended vulcanizates have a ratio of 35 to 65 percent of the resin and about 65 to 35 percent of the rubber. Peroxide, azide and sulfur vulcanizing agents may be used to effect curing of the rubber. Typical monoolefin copolymer rubbers include saturated EPM (ethylene-propylene rubbers) or unsaturated EPDM (ethylene-propylene-diene terpolymer rubbers).

U.S. Pat. No. 4,594,390 teaches that improved thermoplastic elastomer materials are obtained when a composition comprising polypropylene, an EPDM rubber, an extender oil and a curative is masticated at a shear rate of at least 2000 sec$^{-1}$. Suitable results are obtained with shear rates of 2500 to 7500 sec$^{-1}$.

U.S. Pat. No. 4,207,404 discloses thermoplastic elastomer compositions prepared by dynamic vulcanization of blends of chlorinated polyethylene and nylon in the presence of a peroxide vulcanizing agent.

U.S. Pat. No. 3,806,558 discloses partially cured blends of a monoolefin copolymer rubber, such as those disclosed in U.S. Pat. No. 4,130,535, and a polyolefin plastic, usually polyethylene or polypropylene. The blend is mixed with a small amount of curative, and subjected to curing conditions while working the mixture dynamically.

A. Y. Coran, R. P. Patel and D. Williams, in an article entitled "Rubber-Thermoplastic compositions. Part V. Selecting Polymers for Thermoplastic Vulcanizates," Rubber Chemistry and Technology, Vol. 55, 116 (1982), describe approximately one hundred thermoplastic vulcanizate compositions, based on nine kinds of thermoplastic resin and eleven kinds of rubber. All compositions contain sixty parts of rubber and forty parts of plastic. They prepare these compositions by melt mixing the plastic, rubber and other components in a Brabender or Haake mixer. Generally, the plastic, rubber and other components of the composition, except for curatives, are mixed at controlled elevated temperatures (Table I) for about 2–6 minutes during which time the plastic melts and a blend is formed with the rubber. After blend formation, curatives are added to crosslink the rubber, and mixing is continued until a maximum consistency or mixing torque is observed. Each composition is removed from the mixer and then remixed for an additional minute in the molten state to insure uniformity of the mixture. One of the rubber materials is chlorinated polyethylene (CPE). The plastic materials, listed in Table I on page 117, include polypropylene (PP), polyethylene (PE), polystyrene (PS), an acrylonitrile-butadiene-styrene polymer (ABS), a styrene-acrylonitrile copolymer (SAN), polymethyl methacrylate (PMMA), poly-tetramethylene terephthalate (PTMT), Nylon-6,9 (PA) and polycarbonate (PC). One of the mechanical properties, tension set (ASTM D412-66), is determined by stretching 51 mm long specimens to 102 mm for 10 minutes then by measuring set after 10 minutes relaxation. Chlorinated polyethylene compositions are cured by peroxides, specifically 2,5-dimethyl-2,5-bis(t-butyl peroxy)hexane. Tension set values abstracted from Table IX at page 125 are as follows: (a) CPE/PP—55%; (b) CPE/PE—58%; (c) CPE/ABS—65%; (d) CPE/ABS—91%; (e) CPE/PMMA—82%; (f) CPE/PTMT—40%; (g) CPE/PA—59%; and (h) CPE/PC—85%. They note that the 40% value may not be accurate because the CPE is insufficiently stable to withstand processing at the high melt temperatures for PTMT.

SUMMARY OF THE INVENTION

One aspect of the present invention is a process for preparing a thermoplastic elastomer material from a blend of an amorphous chlorinated polyethylene and a crystalline thermoplastic polymer, the process comprising:

a. forming a heat-plastified, substantially uniform admixture comprising an amorphous chlorinated polyethylene, a plasticizing material compatible with the chlorinated polyethylene, a crystalline thermoplastic polymer, and a basic material; and b. dispersing a vulcanizing material for the chlorinated polyethylene throughout the admixture while mixing said admixture at a temperature sufficient to activate the vulcanizing package without substantially degrading any component of the composition and for a period of time sufficient to cure substantially all of the chlorinated polyethylene, the vulcanizing material comprising (1) a derivative of 2,5-dimercapto-1,3,4-thiadiazole or (2) 2,5-dimercapto-1,3,4-thiadiazole and an activator material.

A related aspect of the present invention is a process for preparing a thermoplastic elastomer material from a blend of an amorphous chlorinated polyethylene and a crystalline thermoplastic polymer, the process comprising:

a. forming a heat-plastified, substantially uniform admixture comprising an amorphous chlorinated polyethylene, a plasticizing material compatible with the chlorinated polyethylene, a crystalline thermoplastic polymer and a basic material;

b. dispersing a vulcanizing material for the chlorinated polyethylene throughout the admixture while mixing said admixture at a temperature sufficient to activate the vulcanizing package without substantially degrading any component of the composition and for a period of time sufficient to partially cure the chlorinated polyethylene, the vulcanizing package comprising (1) a derivative of 2,5-dimercapto-1,3,4-thiadiazole or (2) 2,5-dimercapto-1,3,4-thiadiazole and an activator material; and c. completing vulcanization of the chlorinated polyethylene via static curing.

The present invention also relates to the thermoplastic elastomer materials so prepared. These materials suitably have a tension set value, at 100% elongation (ASTM D412), of less than about 50%. Materials having tension set values of greater than 50% are believed to be unsuitable for use as elastomers. Thus, a third aspect of the present invention is a thermoplastic elastomeric composition comprising a blend of one hundred parts by weight of an amorphous chlorinated polyethylene resin, from about twelve to about one hundred fifty parts by weight of a crystalline thermoplastic polyolefin resin, and plasticizing material in an amount of from about five to about one hundred fifty parts by weight, the composition being processable in an internal mixer to provide a product which forms an essentially continuous sheet following transfer, with the resin components in a heat-plastified state, to the rotating rolls of a rubber mill.

DESCRIPTION OF PREFERRED EMBODIMENTS

The crystalline thermoplastic polymer is a solid, high molecular weight, resinous plastic material made by polymerizing olefins such as ethylene, propylene, butene-1, pentene-1, 4-methylpentene, and the like by conventional processes. Illustrative polymers include low density polyethylene (0.910 to 0.925 grams per cubic centimeter (g/cc)), medium density polyethylene (0.926 to 0.940 g/cc) or high density polyethylene (0.941 to 0.965 g/cc), whether prepared by high pressure processes or low pressure processes. Polyesters such as polyethylene terephthalate may also provide suitable results. Particularly suitable polymers include the crystalline forms of polypropylene. Crystalline block copolymers of ethylene and propylene (which are plastics distinguished from amorphous, random ethylene-propylene elastomers) can also be used. Included among the polyolefin resins are the higher alpha-olefin modified polyethylenes and polypropylenes (see, "Polyolefins," N. V. Boenig, Elsevier Publishing Co., N.Y. 1966).

Materials other than crystalline thermoplastic polymers may be used in conjunction with the amorphous chlorinated polyethylene provided such materials are mechanically compatible with the chlorinated polyethylene. "Mechanically compatible", as used herein, means that the polymers form a two phase mixture that does not undergo substantial delamination. Illustrative materials believed to meet this criterion include glassy polymers such as polycarbonates, styrene-acrylonitrile copolymers and terpolymers of acrylonitrile, butadiene and styrene.

Chlorinated polyethylene starting materials suitable for purposes of the present invention are finely-divided particles which must meet four physical property criteria. First, the materials must have a weight average molecular weight of from about 40,000 to about 300,000. Second, the materials must have a chemically combined chlorine content of from about 20 to about 48 percent by weight of polymer. Third, the materials must have a 100 percent modulus, measured in accordance with ASTM Test D-412, from about 0.5 to about 4.8 MPa. Fourth, the materials must have a relative crystallinity of from about 0 to about 15 percent, preferably from about 0 to about two percent.

Chlorinated polyethylene materials meeting the aforementioned physical property criteria can be prepared by a chlorinated procedure of the type disclosed in U.S. Pat. No. 3,454,544, the teachings of which are incorporated herein by reference thereto.

Satisfactory chlorinated polyethylene resins are readily obtained by practice of a chlorination procedure which comprehends suspension chlorination, in an inert medium, of a finely divided, essentially linear polyethylene or olefin interpolymer. The interpolymer contains at least about 90 mole percent ethylene with the remainder being one or more ethylenically unsaturated monomers polymerizable therewith. The polymer is first chlorinated at a temperature below its agglomeration temperature for a period of time sufficient to provide a partially chlorinated polymer having a chlorine content of from about 2 to 23 percent chlorine, based on the total weight of polymer. This is followed by sequential suspension chlorination of the partially chlorinated polymer, in a particulate form, at a particular temperature. The particular temperature is, with respect to the olefin interpolymer, above its agglomeration, temperature but at least about 2° Centigrade below its crystalline melting point. Sequential chlorination is continued for a period of time sufficient to provide a chemically combined chlorine content of up to about 48 percent by weight of polymer.

Useful ethylenically unsaturated monomers include non-aromatic hydrocarbon olefins having three or more carbon atoms such as propylene, butene-1, 1,4-hexadiene, 1,5-hexadiene, octene-1, 1,7-octadiene, 1,9-decadiene and the like; substituted olefins such as acrylic acid, acrylic acid esters and the like; alkenyl aromatic compounds such as styrene and its derivatives, and other known polymerizable materials.

The temperature at which chlorination normally leads to agglomeration of polymer particles depends to a large extent on the nature and molecular weight of the polymer to be chlorinated. In the case of crystalline and predominantly straight chain polyethylenes having a branching of the chains of less than one methyl group per 100 carbon atoms and a density of at least 0.94 grams per cubic centimeter, the temperature is above 95° Centigrade, in particular above 100° Centigrade or even about about 110° Centigrade. In the case of polyethylenes having a relatively marked branching of the chains and a lower density, the temperature is lower, about 65° Centigrade.

The temperature employed in the sequential chlorination must be greater than that employed in the initial chlorination in order to prevent (a) retention of excessive undesirable crystallinity and (b) formation of nonuniformly chlorinated polymer. The temperature employed in the sequential chlorination must also be below the crystalline melting point of the polymer being chlorinated in order to prevent accelerated particle size growth and development of undesirable agglomeration of polymer particles.

After a polyolefinic material has been suspension chlorinated to a desired degree, it may easily be filtered from suspension in the inert suspending liquid, washed and dried to prepare it for subsequent use.

The present invention is not restricted to chlorinated polyethylene resins prepared by suspension or slurry chlorination procedures. Solution chlorination and bulk, or fluidized bed, chlorination procedures may also be used provided the polymers produced thereby meet the aforementioned requirements with regard to chlorine content and residual crystallinity.

The thermoplastic elastomers or vulcanizates of the present invention are suitably cured with a cure package comprising a basic material and 2,5-dimercapto-1,3,4-thiadiazole or a derivative thereof. These cure packages are disclosed in U.S. Pat. Nos. 4,128,510 and 4,288,576, the teachings of which are incorporated herein by reference thereto.

Peroxide cure packages are believed to be unsuitable for use in curing blends as disclosed herein, particularly where the crystalline olefin polymer is polypropylene. Physical properties and handling characteristics of the blends indicate either a lack of sufficient crosslinking or at least partial degradation of the polypropylene.

Illustrative derivatives of 2,5-dimercapto-1,3,4-thiadiazole include:

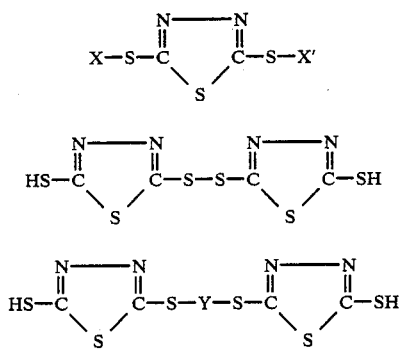

wherein X is a substituent selected from hydrogen, —CRR'OH, —(CH$_2$—CH—O)$_n$H,

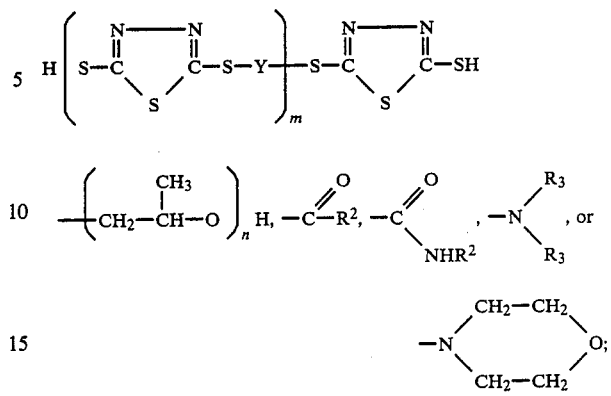

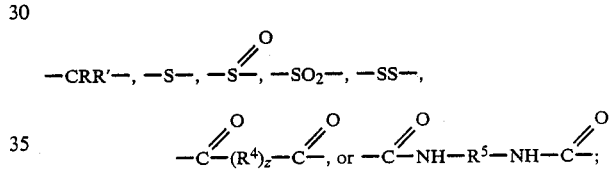

where m is an integer of from 2 to 10; n is an integer from 1 to 5; R and R' are selected from hydrogen, alkyl groups containing 1-8 carbon atoms, and aryl, alkaryl or aralkyl groups containing 6 to 8 carbon atoms; R$^2$ is an alkyl group containing 1-17 carbon atoms, an aryl group containing one or two rings, an alkaryl group containing 7-14 carbon atoms, an aralkyl group containing 7-8 carbon atoms or a cyclohexyl group; and R$^3$ is an alkyl group containing 1-8 carbon atoms. X' can be the same as X with the exception of hydrogen and Y is zinc, lead, $$-CRR'-, -S-, -S\overset{O}{\underset{}{\parallel}}-, -SO_2-, -SS-,$$

$$-\overset{O}{\underset{}{\overset{\parallel}{C}}}-(R^4)_z-\overset{O}{\underset{}{\overset{\parallel}{C}}}-, \text{ or } -\overset{O}{\underset{}{\overset{\parallel}{C}}}-NH-R^5-NH-\overset{O}{\underset{}{\overset{\parallel}{C}}}-;$$

where R$^4$ is an alkylene or alkenylene group containing 1-8 carbon atoms, or a cycloalkylene, arylene or a alkarylene group containing 6-8 carbon atoms; z is 0 or 1; and R$^5$ is an alkylene group containing 2-8 carbon atoms or a phenylene, methylphenylene or methylenediphenylene group.

Basic materials suitable for use in conjunction with derivatives of 2,5-dimercapto-1,3,4-thiadiazole include inorganic materials such as basic metal oxides and hydroxides and their salts with weak acids, such as, for example, magnesium hydroxide, magnesium oxide, calcium oxide, calcium hydroxide, barium oxide, barium carbonate, sodium phenoxide and sodium acetate. These basic materials also serve as heat stabilizers for chlorinated polyethylene. Thus, they are beneficially admixed with the chlorinated polyethylene before the polymer blend is converted to a heat-plastified admixture rather than in conjunction with the thiadiazole derivative. Additional basic material may, if desired, be added together with the thiadiazole derivative. Other basic materials may also be used so long as they do not promote degradation of one of the components of the blend or deactivate the vulcanizing materials. The basic material is preferably magnesium oxide or magnesium hydroxide.

Basic or activator materials suitable for use in conjunction with 2,5-dimercapto-1,3,4-thiadiazole include (1) amines having a boiling point above about 110° C., and a pK value below about 4.5; (2) salts of amines having pK values below about 4.5 with acids having pK values above about 2.0; (3) quaternary ammonium hydroxides and their salts with acids having pK values above about 2.0; (4) diphenyl- and ditolyl-guanidines; and (5) the condensation product of aniline and at least one mono-aldehyde containing one to seven carbon atoms, in combination with at least an equal amount of an inorganic base. The term "pK value" refers to the dissociation constants of bases and acids in aqueous solution. Representative values are shown in the Handbook of Chemistry and Physics, 45th Edition, The Chemical Rubber Co., page D-76 (1964). As noted in the preceding paragraph, a certain amount of a basic material such as magnesium oxide or magnesium hydroxide must also be present to heat stabilize the chlorinated polyethylene.

The plasticizing material is suitably selected from the group consisting of trimellitate esters, phthalate esters, aromatic oils and polyesters of dicarboxylic acids containing from about two to about ten carbon atoms. The plasticizing material is desirably trioctyl trimellitate.

The ingredients save for the vulcanizing material are mixed at a temperature sufficient to soften the crystalline thermoplastic polymer or, more commonly, at a temperature above its melting point if the polymer is crystalline at ordinary temperatures. Blending is carried out for a time sufficient to form a generally uniform blend of the components. It is accomplished by any one of a number of conventional techniques, for example, in an internal mixer, two-roll mill or extruder. After the resin and rubber are intimately mixed, the vulcanizing material is added. Heating and masticating the blend components at vulcanization temperatures are generally adequate to complete curing in a few minutes. If shorter vulcanization times are desired, higher temperatures may be used, provided they are low enough to preclude substantial degradation of the chlorinated polyethylene.

Suitable vulcanization temperatures range from about the melting temperature of the crystalline thermoplastic polymer (about 130° C. in the case of polyethylene and about 175° C. in the case of polypropylene) to 250° C. or more. Typically, the range is from about 150° C. to 225° C. A preferred range of vulcanization temperatures is from about 180° to about 200° C. Thermoplastic vulcanizates are beneficially prepared by continuously mixing the compositions, after the vulcanizing material is added, until vulcanization is complete.

If desired from an economic point of view, completion of vulcanization may be accomplished by static vulcanization provided sufficient curing by dynamic vulcanization has occurred before static vulcanization begins. If insufficient dynamic vulcanization occurs, an unprocessable thermoset vulcanizate may be obtained.

Physical property values from a hybrid of dynamic vulcanization and static vulcanization, where adequate dynamic vulcanization has occurred, do not differ appreciably from those obtained from blends cured solely by dynamic vulcanization. By way of illustration, sufficient dynamic vulcanization occurs in as little as one minute in a heated mixer operating at a temperature of about 400° F. (about 204° C.) if the components of the blend are premixed. Without premixing, five minutes or even longer may be required to achieve sufficient dynamic vulcanization in such a heated mixer. If appreciable static curing occurs before the rubber is dispersed and the thermoplastic becomes a continuous phase, an unprocessable thermoset vulcanizate may be obtained.

A convenient measure of the state of cure of the thermoplastic elastomer compositions of the present invention is obtained by comparing the tensile strength of the blend before and after dynamic vulcanization. The dynamically vulcanized blend using a thiadiazole cure package suitably has a tensile strength of about 1.3 megapascals (MPa) and desirably 3.4 MPa or more greater than that of the unvulcanized blend or the peroxide cured blend.

The properties of the thermoplastic vulcanizates of this invention may be modified, either before or after vulcanization, by adding ingredients which are conventional in the compounding of chlorinated polyethylene elastomers, polyolefin resins and blends thereof. Skilled artisans will recognize, however, that chlorinated polyethylene compounding additives generally must be added before vulcanization if they are to have an effect upon the chlorinated polyethylene. The timing of addition is not as critical for addition of ingredients to the thermoplastic portion of the materials of the present invention.

Examples of suitable ingredients or additives include various carbon blacks, alumina, silica, titanium dioxide, calcium carbonate, colored pigments, clays, zinc oxide, stearic acid, accelerators, vulcanizing agents, sulfur, stabilizers, antioxidants, antidegradants, processing aids, adhesives, tackifiers, plasticizers, processing aids such as lubricants and waxes, prevulcanization inhibitors, discontinuous fibers such as glass fibers and wood cellulose fibers, and extender oils. The amounts used depend, at least in part, upon the quantities of other ingredients in the composition and the properties desired from the composition. Minor amounts of other saturated and unsaturated polymers such as alpha-olefins may be added to reduce the cost or modify the properties of the composition.

The addition of carbon black, or an extender oil or both is recommended, particularly if accomplished prior to dynamic vulcanization. Carbon black improves the tensile strength and extender oil can improve the resistance to oil swell, heat stability, hysteresis, cost and permanent set of the thermoplastic vulcanizate. The addition of extender oil can also improve processability.

Aromatic, naphthenic and paraffinic extender oils provide satisfactory results so long as they are used in amounts which do not exceed their limits of compatibility with chlorinated polyethylene. Suitable extender oils are identified in *Rubber World Blue Book, Materials and Compounding Ingredients for Rubber* (1975), pages 145-190. The quantity of extender oil added depends upon the properites desired. The upper limit, which depends upon the compatibility of a particular oil and blend ingredients, is exceeded when excessive exudation of extender oil occurs. Typically, 5-150 parts by weight extender oil are added per 100 parts by weight of chlorinated polyethylene. Commonly, from about 30 to about 125 parts by weight of extender oil are added per 100 parts by weight of chlorinated polyethylene present in the blend with quantities of from about 70 to 100 parts by weight of extender oil per 100 parts by weight of chlorinated polyethylene being preferred.

Typical additions of carbon black comprise about 40-250 parts by weight of carbon black per 100 parts by weight of chlorinated polyethylene and usually about 20-100 parts by weight carbon black per 100 parts by weight of chlorinated polyethylene. The amount of carbon black which can be used depends, at least in part, upon the type of carbon black and upon the amount of extender oil to be used.

Thermoplastic elastomeric vulcanizates prepared as described herein are useful for making a variety of articles such as tires, hoses, belts, gaskets, moldings and molded parts. They are particularly useful for making articles by extrusion, injection molding and compression molding techniques. They also are useful for modifying thermoplastic resins in general and polyolefin resins in particular. The vulcanizates are suitably blended with thermoplastic resins using conventional mixing equipment. The properties of the modified resin depend upon the amount of vulcanizate blended. Generally, the amount of vulcanizate is sufficient to provide from about 5 to 25 parts by weight of chlorinated polyethylene per hundred parts by weight of the modified resin.

The following examples are for purposes of illustration only and are not to be construed as limiting the scope of the present invention. All parts and percentages are by weight unless otherwise specified. Arabic numerals are used to identify examples representing the present invention whereas alphabetic characters are used to designate comparative examples.

SAMPLE PREPARATION

A 1450 cubic centimeter (cc) capacity Banbury mixer is used to provide initial melt compounding of all blends and, when appropriate curative components are added and activated, at least partial curing of said blends. Further mixing and, if needed, completion of curing takes place when the contents of the Banbury mixer are placed on a heated two roll mill. Curing may also be completed in a static cure oven.

A. Multiple Step Banbury Mix Procedure

1. Prepare a rubber masterbatch by adding chlorinated polyethylene, stabilizers, fillers, plasticizers and other additives to the Banbury mixer while it is operating at low speed (about 77 revolutions per minute (rpm)) and cooling water is circulating through the front and rear rotors, right and left sides and fixed sections of the Banbury mixer. As noted hereinabove, the base to be used in conjunction with the vulcanizing material may also function as the stabilizer. The amounts of masterbatch components are sufficient to fill the mixing cavity. Mixing continues for about minutes at which me the temperature of the contents reaches 325° Fahrenheit (°F.) (approximately 163° C.).

2. Remove part of the masterbatch, replace it with an amount of crystalline thermoplastic polymer and continue mixing for about five minutes at a temperature of about 350° F. (approximately 176° C.). The temperature of the contents is controlled by varying the mixer speed.

3. Remove the blend from the Banbury mixer and place it on a two roll rubber compounding mill operating at a set temperature of about 70° F. (approximately 21° C.) with a gap between the rolls of about 200 mils (5 millimeters (mm)).

4. After cooling the blend on the two roll mill for a period of about two minutes, add components to be used in vulcanizing the blend (also known as the "cure package") and continue mixing for a period of about two minutes.

5. Remove the roll milled blend (also known as "the blanket") from the two roll mill, cut it into strips and add the strips to the Banbury mixer which is operating at a set temperature of from about 350° F. (approximately 176° C.) to about 370° F. (approximately 188° C.). Mixing and curing of the CPE continues for about seven minutes with temperature control as in step 2.

This period of time is generally sufficient to completely cure the CPE component of the blend.

6. Remove the contents of the Banbury mixer and mix for two minutes on a hot two roll mill (heated with 150 pounds per square inch (psi) steam) with a gap between the rolls of about 200 mils (5 millimeters (mm)). This final mixing on the roll mill is done to assure that uniform samples are used to prepare compression molded samples for testing. Remove the contents from the mill in the form of a sheet having a thickness of about 65 mils (approximately 1.7 mm).

7. Compression mold the sheets to a thickness of 60 mils (approximately 1.5 mm) using a heated (372° F. (approximately 189° C.)) press. The press and its contents are first preheated with no applied force for two minutes. The contents are then pressed for three minutes with an applied force of twenty tons, cooled for four minutes with an applied force of twenty tons and then removed from the press after the force is relieved. The compression molded sheets are used for physical property characterization.

B. Single Load Banbury Mix Procedure

1. Same as step 1 of the Multiple Step Banbury Mix Procedure except that the mixer is not completely filled with rubber masterbatch components. In other words, there is sufficient room to add the crystalline thermoplastic polymer without the necessity of removing a portion of the masterbatch.

2. Add an amount of crystalline thermoplastic polymer and continue mixing for about five minutes at a temperature of about 350° F. (approximately 176° C.). The amount is generally sufficient to fill the mixer. The temperature of the contents is controlled by varying the mixer speed.

3. Add the vulcanizing material to the blend while continuing mixing. The vulcanizing material is placed in a small bag formed from an ethylene/acrylic acid copolymer commercially available from The Dow Chemical Company under the trade designation Primacor ™. The bag is used to minimize, if not eliminate, loss of vulcanizing material to the wall of the mixer. Mixing and curing continues for about seven minutes at a temperature of from about 350° F. to about 370° F. (from about 176° C. to about 188° C.). As noted herein, at step 5 of the Multiple Step Procedure, this period of time is generally sufficient to completely cure the CPE component of the blend.

4. Same as step 6 of the Multiple Step Banbury Mix Procedure.

5. Same as step 7 of the Multiple Step Banbury Mix Procedure.

Test Procedures

The following American Society for Testing and Materials (ASTM) Tests are used to characterize the physical properties of materials prepared in accordance with procedures A and B above:

| | |
|---|---|
| Specific Gravity | ASTM Method D792 |
| Hardness | ASTM Method D2240 |
| Tensile Strength | ASTM Method D412 |
| Elongation | ASTM Method D412 |
| Modulus | ASTM Method D412 |
| Tension Set | ASTM Method D412 |
| Compression Set | ASTM Method D395B |
| Oil Resistance | ASTM Method D471 |

EXAMPLES 1-3

CPE/PP Thermoplastic Elastomer

Using the Multiple Step Banbury Mix Procedure (Procedure A) or the Single Load Banbury Mix Procedure (Procedure B), sample sheets are prepared from the composition shown in Table I. In Example 1, the amount of trioctyl trimellitate is 85 parts and the amount of polypropylene is 56.0 parts. In Examples 2 and 3, the amount of trioctyl trimellitate is 100 parts and the amount of polypropylene is 59.9 parts.

Physical property test values obtained from said sample sheets are summarized in Table II.

TABLE I

EXAMPLE 1 COMPOSITION

| Parts/Hundred Parts of CPE | Component Description/Source-Purpose |
|---|---|
| 30 | carbon black N330 - filler material |
| 5.2 | hydrated amorphous silica, commercially available from PPG Industries, Inc. under the trade designation HiSil ™ 223 - filler material |
| 5.2 | magnesium oxide, commercially available from Elastochem Inc. under the trade designation Maglite ™ D - activator |
| 85 or 100 | trioctyltrimellitate - oil extender |
| 100 | chlorinated polyethylene, commercially available from The Dow Chemical Company under the trade Designation Tyrin ™ CM0136 - rubber |
| 56.0 or 59.9 | polypropylene, commercially available from Himont, Inc. under the trade designation Pro-fax ™ 6723 - thermoplastic |
| 3.0 | 5-mercapto-1,3,4-thiadiazole-2-thiobenzoate, commercially available from Hercules Inc. under the trade designation Echo-S ™ - curative |
| 0.9 | condensation product of analine and butyraldehyde commercially available from R. T. Vanderbilt Co., Inc. under the trade designation Vanax ™ 808 - curative accelerator |

TABLE II

Physical Property Data for Examples 1-3

| Process/Physical Property (Unit of Measure) | Ex. 1 | Ex. 2 | Ex. 3 |
|---|---|---|---|
| Process | A | A | B |
| Specific Gravity | 1.12 | 1.11 | 1.11 |
| Hardness, Shore A | 80 | 78 | 82 |
| Ultimate Tensile (psi/MPa) | 1128/7.8* | 1087/7.5* | 1192/8.2 |
| Elongation (%) | 258* | 292* | 256 |
| 100% Modulus (psi/MPa) | 608/4.2* | 548/3.8* | 670/4.6 |
| 200% Modulus (psi/MPa) | 946/6.5* | 836/5.8* | 997/6.9 |
| Tension Set @ 100% Elong. | 16 | 15 | 15 |
| Compression Set 212° F./70 Hours | 60 | 63 | 65 |
| ASTM Oil 2, 250° F./70 Hours | | | |
| Volume Swell (%) | 8 | 5 | 4 |
| % Tensile Retained | 66 | 62 | 79 |
| % Elong. Retained | 80 | 57 | 69 |
| % 100% Mod. Ret. | 86 | 99 | 91 |
| ASTM Oil 3, 250° F./70 Hours | | | |
| Volume Swell (%) | 24 | 20 | 19 |
| % Tensile Retained | 54 | 57 | 61 |
| % Elong. Retained | 66 | 64 | 70 |
| % 100% Mod. Ret. | 62 | 74 | 77 |

*Average of two test samples

The data presented in Table II demonstrate that similar results are obtained by the single step and multi-step processes. The data also demonstrate that satisfactory results are obtained with two different levels of trioctyl trimellitate. Similar results are expected with other compositions and process variations which fall within the scope of the present invention.

EXAMPLE 4 AND COMPARATIVE EXAMPLES A-B

Cure System Comparison

Using the Single Load Banbury Mix Procedure (Procedure B), sample sheets are prepared from compositions similar to that shown in Table I. In Example 4 and Comparative Examples A and B, the amount of trioctyl trimellitate is 100 parts and the amount of polypropylene is 59.9 parts. In Example 4, the amount of accelerator is increased to 1.0 part. In Comparative Example A, no cure package is used and in Comparative Example B, curing is accomplished with a peroxide cure package. The peroxide cure package includes 6.0 parts of $\alpha-\alpha'$-bis(t-butylperoxy)diisopropylbenzene on Burgess KE Clay, commercially available from Hercules Inc. under the trade designation Vul-Cup ™ 40KE and 2.0 parts of triallyl trimellitate (commercially available from C. P. Hall). Physical property test values obtained from said sample sheets are summarized in Table III.

TABLE III

Cure System Comparison

| Process/Physical Property (Unit of Measure) | Ex. 4 | Comp Ex. A | Comp Ex. B |
|---|---|---|---|
| Process | B | B | B |
| Specific Gravity | 1.11 | 1.10 | 1.12 |
| Hardness, Shore A | 80 | 78 | 75 |
| Ultimate Tensile (psi/MPa) | 1137/7.8 | 937/6.5 | 471/3.2 |
| Elongation (%) | 257 | 533 | 197 |
| 100% Modulus (psi/MPa) | 665/4.6 | 518/3.6 | 372/2.6 |
| 200% Modulus (psi/MPa) | 963/6.6 | 601/4.1 | — |
| Tension Set @ 100% Elong. | 16 | 28 | 22 |
| Compression Set 212° F./70 Hours | 56 | 87 | 90 |
| ASTM Oil 2, 250° F./70 Hours | | | |
| Volume Swell (%) | 5 | 13 | 21 |
| % Tensile Retained | 69 | 51 | 51 |
| % Elong. Retained | 65 | 24 | 21 |
| % 100% Mod. Ret. | 96 | 84 | — |
| ASTM Oil 3, 250° F./70 Hours | | | |
| Volume Swell (%) | 20 | 47 | 42 |
| % Tensile Retained | 60 | 34 | 18 |
| % Elong. Retained | 60 | 18 | 17 |
| 100% Mod. Ret. | 81 | — | — |

— not measured

The data presented in Table III demonstrate that physical properties are improved when the CPE/PP blends are cured with a thiadiazole cure. The data also demonstrate that physical properties are degraded when the blends are cured with a conventional peroxide

---

-continued

| Heat Resistance | ASTM Method D573 |
|---|---| cure package. Similar results are obtained with other compositions within the scope of the present invention.

COMPARISON EXAMPLES C-F

Commercial Thermoplastic Elastomer Physical Properties

In order to evaluate the potential suitability of the thermoplastic elastomers of the present invention, four commercially available thermoplastic elastomers are subjected to the same tests as Examples 1 and 2. Comparative Example C is Santoprene TM 201(73), commercially available from Monsanto Co. Comparative Example D is Santoprene TM 201(80), commercially available from Monsanto Co. Comparative Example E is Alcryn TM 1201B, an oil resistant thermoplastic elastomer commercially available from E. I. DuPont de Nemours & Co. Comparative Example F is Geolast TM 701, an oil resistant thermoplastic elastomer commercially available from Monsanto Co. The test results are presented in Table IV which follows. Example 1 is included in Table IV for ease of comparison.

TABLE IV

| | Physical Property Comparison | | | | |
|---|---|---|---|---|---|
| Process/Physical | Physical Property Measured Value | | | | |
| Property (Unit of Measure) | Ex 1 | Comp Ex C | Comp Ex D | Comp Ex E | Comp Ex F |
| Specific Gravity | 1.12 | .968 | .966 | 1.23 | 1.09 |
| Hardness, Shore A | 80 | 76 | 80 | 65 | 80 |
| Ult. Tens. psi/MPa | 1123/ 7.8* | 1451/ 10.0 | 1494/ 10.3 | 1796/ 12.4 | 1339/ 9.2 |
| Elongation % | 258* | 513 | 415 | 280 309 | 200 294 |
| 100% Mod, psi.MPa | 608/ 4.2* | 472/ 3.3 | 598/ 4.1 | 608/ 4.2* | 548/ 3.8* |
| 200% Mod, psi.MPa | 946/ 6.5* | 607/ 4.2 | 813/ 5.6 | 1162/ 8.0* | 1246/ 8.6* |
| Tension Set at 100% Elong. | 16 | 15 | 10 | 6 | 12 |
| Compression Set 212° F./70 hours | 60 | 40 | 40 | 59 | 50 |
| Low Temp Britt °C. | −36 | −60** | −60** | −35 | −38 |
| ASTM Oil 2, 250° F/70 Hr | | | | | |
| Vol Swell % | 8 | 46 | 40 | 4 | 2 |
| % Tens Ret | 66 | 68 | 77 | 103 | 97 |
| % Elong Ret | 80 | 64 | 76 | 93 | 79 |
| % 100% Mod Ret | 86 | 86 | 101 | 94 | 109 |
| ASTM Oil 3, 250° F/70 Hr | | | | | |
| Vol Swell % | 24 | 65 | 59 | 17 | 13 |
| % Tens Ret | 54 | 61 | 74 | 82 | 71 |
| % Elong Ret | 66 | 58 | 74 | 78 | 61 |
| % 100% Mod Ret | 62 | 75 | 95 | 85 | 90 |

*average of two test samples
**reported by manufacturer

The data presented in Table IV demonstrate that the thermoplastic elastomers of the present invention compare favorably with commercially available materials in terms of physical properties such as tension set at 100% elongation, tensile, elongation, oil resistance and low temperature impact resistance.

EXAMPLES 5-9

Effect of Different Polypropylene on Properties

Using the Single Mix Procedure (Procedure B), sample sheets were prepared from a composition similar to that shown in Table I. The type and amount of filler materials, chlorinated polyethylene, curative and curative co-agent are the same. The amount of trioctyltrimellitate is one hundred parts. The following polypropylenes are used in amount of 59.9 parts: PP-A is Pro-fax TM 6723, 0.8 g/10 min. melt index; PP-B is Pro-fax TM 6524, 4.0 g/10 min. melt index; PP-C is Pro-fax TM 6324, 12.0 g/10 min. melt index; PP-D is Pro-fax TM 6301, 12.0 g/10 min. melt index—unstabilized; and PP-E is Pro-fax TM 6224, 35.0 g/10 min. melt index.

Physical property test values together with the type of polypropylene are shown in Table V.

TABLE V

| Effect of Different Types of Polypropylene on Properties | | | | | |
|---|---|---|---|---|---|
| Process/Physical Property (Unit of Measure) | Physical Property Measured Value | | | | |
| | Ex. 5 | Ex. 6 | Ex. 7 | Ex. 8 | Ex. 9 |
| PP Type | A | B | C | D | E |
| Specific Gravity | 1.11 | 1.11 | 1.11 | 1.11 | 1.11 |
| Hardness, Shore A | 86 | 86 | 85 | 86 | 86 |
| Ultimate Tensile (psi/MPa) | 1105/7.6 | 1107/7.6 | 978/6.7 | 926/6.4 | 657/4.5 |
| Elongation (%) | 290 | 225 | 232 | 229 | 189 |
| 100% Modulus (psi/MPa) | 710/4.9 | 853/5.9 | 689/4.8 | 687/4.7 | 657/4.5 |
| 200% Modulus (psi/MPa) | 989/6.8 | 1057/7.3 | 879/6.1 | 886/6.1 | — |
| Tension Set @ 100% Elong. | 25 | 24 | 27 | 26 | 23 |
| Compression Set 212° F./70 Hrs | 73 | 70 | 85 | 80 | 75 |
| ASTM Oil 2, 250° F./70 Hrs | | | | | |
| Volume Swell (%) | 4 | 4 | 5 | 4 | 3 |
| % Tensile Retained | 62 | 49 | 42 | 50 | 46 |
| % Elong. Retained | 45 | 36 | 35 | 37 | 34 |
| ASTM Oil 3, 250° F./70 Hrs | | | | | |
| Volume Swell (%) | 21 | 21 | 24 | 23 | 19 |
| % Tensile Retained | 52 | 44 | 36 | 39 | 39 |
| % Elong. Retained | 44 | 36 | 29 | 22 | 24 |

— cannot be measured

The data presented in Table V demonstrate that high molecular weight polypropylenes (e.g. Ex. 5) produce thermoplastic elastomer materials with higher tensile strength and elongation than lower molecular weight polypropylenes (Ex. 9). The higher molecular weight polypropylenes also have greater tensile strength and elongation values after exposure to oils even though percent property retention does not vary significantly.

Similar results are obtained when samples are exposed to air oven aging as well as with other polymer blend compositions within the scope of the present invention.

EXAMPLES 10-15

Effect of Extender Oil Type Upon Physical Properties

Using the Single Load Banbury Mix Procedure (Procedure B) and, with two exceptions, the composition of Example 4, sample sheets are prepared for physical property testing. One exception is that, for Examples 10-15, the magnesium oxide is changed to a magnesium hydroxide commercially available under the trade designation Marinco ™ H from Calgon. The second exception is in the type of extender oil. The extender oils are as follows: Example 10— TOTM; Example 11— a high boiling aromatic oil commercially available from R. E. Carroll under the trade designation Polyflo ™ 1172 (hereinafter "AR-1"); Example 12— a high boiling aromatic oil commercially available from R. E. Carroll under the trade designation Sundex ™ 8600T (hereinafter "AR-2"); Example 13— a high boiling aromatic oil commercially available under the trade designation Sundex ™ 8125 (hereinafter "AR-3"); Example 14— an aromatic oil commercially available from R. E. Carroll under the trade designation Sundex ™ 790 (hereinafter "AR-4"); and Example 15— dioctyl phthalate (hereinafter "DOP"). Physical property test results are summarized in Table VI.

The data presented in Table VI show that physical property values are generally acceptable for all types of extender oils. The aromatic oils are not as compatible as TOTM with the blends. As such, some bleeding to the surface is observed when aromatic oils are used. The aromatic oils also have less resistance to physical property degradation following thermal aging than TOTM. In addition, low temperature properties are poorer when aromatic oils are used rather than TOTM or DOP or other ester plasticizers. DOP suffers from a similar loss of physical properties following thermal aging. The loss of physical properties following thermal aging, while rendering such compounds unsuitable for high temperature applications such as are experienced in an automobile engine compartment, are not important if the compounds are subjected only to comparatively low temperatures. Similar results are expected with other compounds which are representative of the present invention.

EXAMPLES 16-34

Cure Program Variability

Using the composition of Example 4 except that the amount of polypropylene is 60 parts, a variety of cure programs using only dynamic curing (in the Banbury mixer) or a combination of dynamic curing and static curing (in a heated oven) are evaluated. Results of the evaluation are shown in Table VII.

TABLE VI

| Process/Physical Property | Effect of Extender Oil Type | | | | | |
|---|---|---|---|---|---|---|
| | Physical Property Measured Value | | | | | |
| (Unit of Measure) | Ex. 10 | Ex. 11 | Ex. 12 | Ex. 13 | Ex. 14 | Ex. 15 |
| Type Oil | TOTM | AR-1 | AR-2 | AR-3 | AR-4 | DOP |
| Specific Gravity | 1.11 | 1.15 | 1.10 | 1.12 | 1.10 | 1.11 |
| Hardness, Shor A | 86 | 85 | 85 | 87 | 79 | 82 |
| Ultimate Tensile (psi/MPa) | 1105/7.6 | 1292/8.9 | 923/6.4 | 1053/7.3 | 891/6.1 | 1016/7.0 |
| Elongation (%) | 290 | 314 | 216 | 271 | 239 | 245 |
| 100% Modulus (psi/MPa) | 710/4.9 | 712/4.9 | 709/4.9 | 719/5.0 | 556/3.8 | 649/4.5 |
| 200% Modulus (psi/MPa) | 989/6.8 | 1035/7.1 | 899/6.2 | 904/6.5 | 789/5.4 | 909/6.3 |
| Tension Set @ 100% Elong. | 25 | 30 | 28 | 28 | 16 | 16 |
| Compression Set 212° F./70 Hrs | 73 | 77 | 80 | 82 | 72 | 68 |
| ASTM Oil 2, 250° F./70 Hrs | | | | | | |
| Volume Swell (%) | 2 | 2 | 9 | 5 | 2 | 4 |
| % Tensile Retained | 62 | 55 | 51 | 54 | 72 | 59 |
| % Elong. Retained | 45 | 41 | 42 | 39 | 53 | 44 |
| % 100% Mod. Ret. | 75 | 84 | — | 74 | — | 88 |
| ASTM Oil 3, 250° F./70 Hrs | | | | | | |
| Volume Swell (%) | 20 | 22 | 27 | 23 | 19 | 21 |
| % Tensile Retained | 52 | 43 | 48 | 45 | 58 | 50 |
| % Elong. Retained | 44 | 34 | 50 | 38 | 58 | 50 |
| % 100% Mod. Ret. | 67 | 73 | 57 | 64 | 77 | 69 |

— not measured

TABLE VII

| | Cure Program Variability, Examples 16-21 | | | | | |
|---|---|---|---|---|---|---|
| | Example No. | | | | | |
| | 16 | 17 | 18 | 19 | 20 | 21 |
| CURE PROGRAM (MINUTES) | | | | | | |
| Mix Rubber Component | 3 | 3 | 3 | 3 | 3 | 3 |
| Add PP then Mix | 4 | 4 | 4 | 4 | 4 | 4 |
| Dynamic (Mixer) Cure Time | 1 | 1 | 1 | 3 | 3 | 3 |
| Roll Mill Time | 1 | 1 | 1 | 1 | 1 | 1 |
| Static (Oven) Cure Time | 0 | 4 | 6 | 0 | 2 | 4 |
| Roll Mill Time | 2 | 2 | 2 | 2 | 2 | 2 |
| Total Mixer Time | 8 | 8 | 8 | 10 | 10 | 10 |
| Total Cure Time | 1 | 5 | 7 | 3 | 5 | 7 |
| PHYSICAL PROPERTIES | | | | | | |
| Ultimate Tensile (psi/mPa) | 1270/8.8 | 1293/8.9 | 1300/9.0 | 1224/8.4 | 1225/8.7 | 1312/9.0 |
| Elongation (%) | 326 | 307 | 325 | 310 | 317 | 324 |
| 100% Modulus (psi/mPa) | 718/5.0 | 737/5.1 | 725/5.0 | 712/4.9 | 703/4.8 | 716/4.9 |

TABLE VII-continued

| | | | | | | |
|---|---|---|---|---|---|---|
| 200% Modulus (psi/mPa) | 1014/7.0 | 1061/7.3 | 1031/7.1 | 908/6.8 | 988/6.8 | 1002/6.9 |
| Tension Set @ 100% Elong. | 25 | 23 | 25 | 28 | 25 | 25 |
| Compression Set (212° F./70 hrs) | 69 | 69 | 68 | 73 | 83 | 78 |
| ASTM OIL #2, 250° F./70 Hrs | | | | | | |
| Volume Swell % | 5 | 4 | 5 | 6 | 7 | 6 |
| % Tensile Retained | 58 | 64 | 51 | 52 | 46 | 57 |
| % Elongation Retained | 33 | 44 | 28 | 33 | 27 | 41 |
| ASTM OIL #3, 250° F./70 Hrs | | | | | | |
| Volume Swell % | 22 | 22 | 23 | 24 | 25 | 24 |
| % Tensile Retained | 49 | 51 | 50 | 43 | 43 | 48 |
| % Elongation Retained | 36 | 44 | 40 | 36 | 34 | 44 |

Cure Variability, Examples 22-27

| | Example No. | | | | | |
|---|---|---|---|---|---|---|
| | 22 | 23 | 24 | 25 | 26 | 27 |
| CURE PROGRAM (MINUTES) | | | | | | |
| Mix Rubber Component | 3 | 3 | 3 | 3 | 0 | 0 |
| Add PP then Mix | 4 | 4 | 4 | 4 | 4 | 4 |
| Dynamic (Mixer) Cure Time | 5 | 5 | 5 | 7 | 1 | 1 |
| Roll Mill Time | 1 | 1 | 1 | 1 | 1 | 1 |
| Static (Oven) Cure Time | 1 | 2 | 4 | 0 | 0 | 2 |
| Roll Mill Time | 2 | 2 | 2 | 2 | 0 | 0 |
| Total Mixer Time | 12 | 12 | 12 | 14 | 5 | 5 |
| Total Cure Time | 5 | 7 | 9 | 7 | 1 | 3 |
| PHYSICAL PROPERTIES | | | | | | |
| Ultimate Tensile (psi/mPa) | 1211/8.3 | 1274/8.8 | 1206/8.3 | 1290/8.9 | 1197/8.3 | 1218/8.4 |
| Elongation (%) | 292 | 318 | 296 | 300 | 276 | 290 |
| 100% Modulus (psi/mPa) | 703/4.8 | 723/5.0 | 692/4.8 | 764/5.3 | 750/5.2 | 722/5.0 |
| 200% Modulus (psi/mPa) | 986/6.8 | 999/6.9 | 966/6.7 | 1033/7.1 | 1032/7.1 | 1003/6.9 |
| Tension Set @ 100% Elong. | 28 | 28 | 25 | 23 | 25 | 25 |
| Compression Set (212° F./70 hrs) | 69 | 74 | 74 | 47 | 83 | 86 |
| ASTM OIL #2, 250° F./70 Hrs | | | | | | |
| Volume Swell % | 6 | 6 | 5 | 7 | 6 | 7 |
| % Tensile Retained | 52 | 58 | 55 | 59 | 52 | 46 |
| % Elongation Retained | 36 | 38 | 41 | 45 | 34 | 28 |
| ASTM OIL #3, 250° F./70 Hrs | | | | | | |
| Volume Swell % | 24 | 25 | 24 | 24 | 24 | 25 |
| % Tensile Retained | 44 | 47 | 47 | 44 | 41 | 37 |
| % Elongation Retained | 38 | 40 | 41 | 36 | 32 | 28 |

Cure Program Variability, Examples 28-34

| | Example No. | | | | | | |
|---|---|---|---|---|---|---|---|
| | 28 | 29 | 30 | 31 | 32 | 33 | 34 |
| CURE PROGRAM (MINUTES) | | | | | | | |
| Mix Rubber Component | 0 | 0 | 0 | 0 | 0 | 0 | 0 |
| Add PP then Mix | 4 | 4 | 4 | 4 | 4 | 4 | 4 |
| Dynamic (Mixer) Cure Time | 1 | 3 | 3 | 3 | 5 | 5 | 5 |
| Roll Mill Time | 1 | 1 | 1 | 1 | 1 | 1 | 1 |
| Static (Oven) Cure Time | 4 | 0 | 2 | 4 | 0 | 2 | 4 |
| Roll Mill Time | 0 | 0 | 0 | 0 | 0 | 0 | 0 |
| Total Mixer Time | 5 | 7 | 7 | 7 | 9 | 9 | 9 |
| Total Cure Time | 5 | 3 | 5 | 7 | 5 | 7 | 9 |
| PHYSICAL PROPERTIES | | | | | | | |
| Ultimate Tensile (psi/mPa) | 1131/7.8 | 1246/8.6 | 1264/8.7 | 1236/8.5 | 1266/8.7 | 1300/9.0 | 1300/9.0 |
| Elongation (%) | 266 | 261 | 260 | 244 | 268 | 284 | 281 |
| 100% Modulus (psi/mPa) | 705/4.9 | 784/5.4 | 765/5.3 | 790/5.4 | 760/5.2 | 776/5.3 | 793/5.5 |
| 200% Modulus (psi/mPa) | 983/6.8 | 1097/7.6 | 1085/7.5 | 1105/7.6 | 1084/7.5 | 1087/7.5 | 1084/7.5 |
| Tension Set @ 100% Elong. | 25 | 25 | 25 | 23 | 25 | 25 | 25 |
| Compression Set (212° F./70 hrs) | 77 | 71 | 73 | 69 | 73 | 73 | 70 |
| ASTM OIL #2, 250° F./70 Hrs | | | | | | | |
| Volume Swell % | 7 | 7 | 6 | 6 | 6 | 7 | 7 |
| % Tensile Retained | 50 | 56 | 47 | 60 | 53 | 52 | 54 |
| % Elongation Retained | 29 | 38 | 31 | 47 | 40 | 37 | 39 |
| ASTM OIL #3, 250° F./70 Hrs | | | | | | | |
| Volume Swell % | 24 | 25 | 24 | 23 | 23 | 24 | 25 |
| % Tensile Retained | 44 | 48 | 49 | 49 | 38 | 46 | 47 |
| % Elongation Retained | 39 | 46 | 48 | 49 | 32 | 44 | 42 |

— not measured

The data presented in Table VII demonstrate that a combination of dynamic curing and static curing provides results in terms of physical properties which are generally equivalent to those obtained with dynamic curing, e.g. Example 18 versus Example 25. The reduction in mixer time corresponds to a reduction in cost of the resulting cured blend.

EXAMPLES 35-38

Effect of CPE Feedstock Melt Index Upon Physical Properties

By duplicating the composition of Example 5 save for the type of CPE, samples are prepared for physical property testing. All of the CPE's have a chemically combined chlorine content of 36 percent by weight of polymer and a heat of fusion of 0.2 calories per gram. They differ primarily in terms of the melt index of the feedstock from which they are prepared. Melt index is determined in accordance with ASTM D-1238, condition 190/2.16. In Example 35, the CPE is prepared from a 0.1 decigram per minute feedstock and is commercially available from The Dow Chemical Company under the trade designation TYRIN TM 3615. In Example 36, the CPE is prepared from a 0.3 decigram per minute feedstock and is commercially available from The Dow Chemical Company under the trade designation TYRIN TM CMO136. In Example 37, the CPE is prepared from a 1.0 decigram per minute feedstock and is commercially available from The Dow Chemical Company under the trade designation TYRIN TM CM552. In Example 38, the CPE is prepared from a 6.0 decigram per minute feedstock and is commercially available from The Dow Chemical Company under the trade designation TYRIN TM CMO636. The physical property data are summarized in Table VIII.

TABLE VIII

| CPE FEEDSTOCK MELT INDEX VARIATION | | | | |
| --- | --- | --- | --- | --- |
| Process/Physical Property | Physical Property Measured Value | | | |
| (Unit of Measure) | Ex. 35 | Ex. 36 | Ex. 37 | Ex. 38 |
| Specific Gravity | 1.11 | 1.11 | 1.11 | 1.11 |
| Hardness, Shore A | 83 | 86 | 85 | 87 |
| Ultimate Tensile (psi/MPa) | 1330/9.2 | 1105/7.6 | 1015/7.0 | 812/5.6 |
| Elongation (%) | 292 | 290 | 266 | 167 |
| 100% Modulus (psi/MPa) | 689/4.8 | 710/4.9 | 695/4.8 | 720/5.0 |
| 200% Modulus (psi/MPa) | 1002/6.9 | 989/6.8 | 904/6.2 | — |
| Tension Set @ 100% Elong. | 25 | 25 | 29 | 30 |
| Compression Set 212° F./70 Hours | 69 | 73 | 80 | 77 |
| Low Temperature Brittleness °C. | −37 | −32 | −33 | −35 |
| ASTM Oil 2, 250° F./70 Hrs | | | | |
| Volume Swell (%) | 7 | 4 | 16 | 11 |
| % Tensile Retained | 53 | 62 | 46 | 46 |
| % Elong. Retained | 49 | 45 | 45 | 44 |
| ASTM Oil 3, 250° F./70 Hrs | | | | |
| Volume Swell (%) | 27 | 21 | 38 | 24 |
| % Tensile Retained | 43 | 52 | 35 | 46 |
| % Elong. Retained | 42 | 44 | 33 | 44 |

— not measured

The data presented in Table VIII highlight three benefits from decreasing the feedstock melt index. First, the tensile strength of the vulcanized blend increases. Second, the tensile set and compression set of the vulcanized blend decrease. Finally, the resistance to oils increases. Similar results are obtained with other compounds which are representative of the present invention.

EXAMPLES 39-42 AND COMPARATIVE EXAMPLE G

Effect of Thermoplastic Polymer Amount Upon Physical Properties

Using the composition of Example 5, save for the amount of polypropylene, samples are prepared for physical property testing. Table IX includes the amount of polypropylene in parts per hundred parts of chlorinated polyethylene as well as in terms of percent by weight of composition. Table IX also displays data from the physical property testing.

TABLE IX

| Effect of Varying the Amount of Thermoplastic Polymer Amount | | | | | |
| --- | --- | --- | --- | --- | --- |
| Process/Physical Property | Physical Property Measured Value | | | | |
| (Unit of Measure) | Ex. 39 | Ex. 40 | Ex. 41 | Ex. 42 | Comp Ex. g |
| Polypropylene Fraction | | | | | |
| Parts/100 parts CPE | 12 | 41 | 78 | 126 | 191 |
| % of Composition Wt. | 4.8 | 14.4 | 24.2 | 34.0 | 43.9 |
| PHYSICAL PROPERTY: | | | | | |
| Specific Gravity | 1.16 | 1.13 | 1.09 | 1.06 | 1.04 |
| Hardness, Shore A | 43 | 72 | 89 | 94 | 98 |
| Elongation (%) | 303 | 310 | 1272 | 247 | 293 |
| Tension Set @ 100% Elong. | 10 | 20 | 35 | 45 | 50 |
| Ultimate Tensile (psi/MPa) | 786/5.4 | 965/6.6 | 1248/8.6 | 1451/10.0 | 1796/12.4 |
| 100% Modulus (psi/MPa) | 227/1.6 | 442/3.0 | 823/5.7 | 1132/7.8 | 1496/10.3 |
| ASTM Oil 2, 250° F./70 Hrs | | | | | |
| Volume Swell (%) | 4 | 6 | 6 | 7 | 7 |
| % Tensile Retained | 77 | 61 | 64 | 83 | 96 |
| % Elong. Retained | 63 | 39 | 37 | 53 | 53 |

A review of the data presented in Table IX show that thermoplastic elastomer materials result when polypropylene comprises from about five to about thirty-five percent of the composition weight (twelve to 126 parts per hundred parts of chlorinated polyethylene). When the polypropylene fraction increases to about forty-four percent of the composition weight (191 parts per hundred parts of chlorinated polyethylene), the tension set at 100% elongation reaches 50. As noted herein, a value of 50 or greater generally indicates a material unsuitable for use as an elastomer. As such, an upper limit on the amount of this type of polypropylene falls within the range of 126 to 191 parts per hundred parts of chlorinated polyethylene. When the polypropylene fraction falls below about five percent (about twelve parts per hundred parts of chlorinated polyethylene), the dynamically vulcanized composition exhibits characteristics of a thermoplastic elastomer notwithstanding some mold shrinkage when compression molded samples are prepared.

Similar results are expected from other compositions representative of the present invention. Although upper and lower limits on the amount of thermoplastic polymer may vary with the type of polymer, satisfactory results are readily attainable without undue experimentation.

What is claimed is:

1. A process for preparing a thermoplastic elastomer material having a tension set value, at 100% elangation, of less than about 50% from a blend of an amorphous chlorinated polyethylene and a crystalline thermoplastic polyolefin polymer, the process comprising:
   a. forming a heat-plastified, substantially uniform admixture comprising an amorphous chlorinated polyethylene, a plasticizing material compatible with the chlorinated polyethylene, a crystalline thermoplastic polyolefin polymer and an inorganic base; and
   b. dispersing a vulcanizing material for the chlorinated polyethylene throughout the admixture while mixing said admixture at a temperature sufficient to activate the vulcanizing material without substantially degrading any component of the composition and for a period of time sufficient to cure substantially all of the chlorinated polyethylene, the vulcanizing material comprising (1) a derivative of 2,5-dimercapto-1,3,4-thiadiazole or (2) a combination of 2,5-dimercapto-1,3,4-thiadiazole and an activator material.

2. The process of claim 1 wherein the heat-plastified admixture also comprises carbon black in an amount of from about 0 to about 40 parts by weight per hundred parts by weight of chlorinated polyethylene.

3. The process of claim 1 wherein the heat-plastified admixture also comprises heat and ultraviolet light stabilizers for said chlorinated polyethylene.

4. The process of claim 1 wherein the inorganic base is selected from the group consisting of basic metal oxides and hydroxides and their salts with weak acids.

5. The process of claim 1 wherein the inorganic base is selected from the group consisting of magnesium oxide, magnesium hydroxide, barium carbonate, barium oxide, calcium oxide, and calcium hydroxide.

6. The process of claim 1 wherein the inorganic base is magnesium oxide or magnesium hydroxide.

7. The process of claim 1 wherein the temperature is from about 121° Centigrade to about 218° Centigrade.

8. The process of claim 1 wherein the period of time is from about 6 to about 15 minutes.

9. The process of claim 1 wherein the heat-plastified, substantially uniform admixture is formed in at least two sequential steps comprising:
   a(1). forming a heat-plastified, substantially uniform admixture by mixing the chlorinated polyethylene, the plasticizing material and the inorganic base at a temperature sufficiently high to heat plastify the chlorinated polyethylene with substantially no degradation thereof; and
   a(2). dispersing the thermoplastic polyolefin polymer throughout the admixture while heating said admixture to a temperature above the polymer's crystalline melting point but below a temperature at which substantial degradation of the chlorinated polyethylene occurs.

10. The process of claim 9 wherein the temperature is step a(1) is from about 27° Centigrade to about 149° Centigrade.

11. The process of claim 9 wherein the temperature in step a(2) is from about 121° Centigrade to about 218° Centigrade.

12. The process of claim 1 wherein the vulcanizing material comprises 2,5-dimercapto-1,3,4-thiadiazole and an activator material selected from (1) amines having a boiling point above about 110° C. and a pK value below about 4.5; (2) salts of amines having pK values below about 4.5 with acids having pK values above about 2.0; (3) quaternary ammonium hydroxides and their salts with acids having pK values above about 2.0; (4) diphenyl- and ditolyl-guanidines; and (5) the condensation products of aniline and at least one monoaldehyde containing one to seven carbon atoms in combination with at least an equal amount of an inorganic base.

13. The process of claim 1 wherein the vulcanizing material is a derivative of 2,5-dimercapto-1,3,4-thiadiazole selected from the group consisting of:

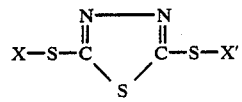

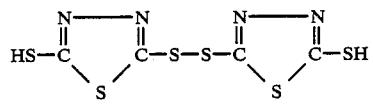

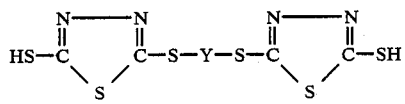

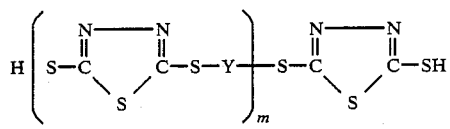

wherein X is a substituent selected from hydrogen, —CRR'OH, —(CH$_2$—CH—O)$_n$H,

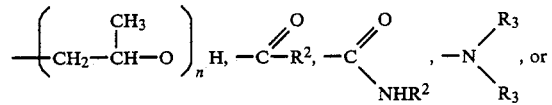

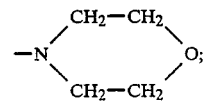

where m is an integer of from 2 to 10; where n is an integer from 1 to 5, R and R' are selected from hydrogen, alkyl groups containing 1-8 carbon atoms, and aryl, alkaryl or aralkyl groups containing 6 to 8 carbon atoms; R$^2$ is selected from alkyl groups containing 1-17 carbon atoms, aryl groups containing one to two rings, alkaryl groups containing 7-14 carbon atoms, aralkyl groups containing 7-8 carbon atoms and cyclohexyl groups; R$^3$ is an alkyl group containing 1-8 carbon atoms; X' is the same as X with the exception of hydrogen; m is an integer from 1 to 10; and Y is selected from zinc, lead,

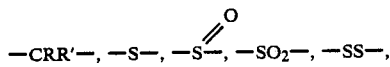

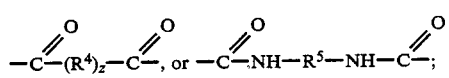

where $R^4$ is selected from alkylene and alkenylene groups containing 1-8 carbon atoms and cycloalkylene, arylene or alkarylene groups containing 6-8 carbon atoms; z is 0 or 1; and $R^5$ is an alkylene group containing 2-8 carbon atoms, or a phenylene, methylphenylene or methylenediphenylene group.

14. The process of claim 1 wherein the amount of chlorinated polyethylene is 100 parts by weight, the amount of plasticizing material is from about 5 to about 150 parts by weight, and the amount of crystalline thermoplastic polyolefin polymer is from about 12 to about 150 parts by weight.

15. The process of claim 1 wherein the plasticizing material is selected from the group consisting of trimellitate esters, phthalate esters, aromatic oils, and polyesters of dicarboxylic acid.

16. The process of claim 1 wherein the plasticizing material is trioctyl trimellitate.

17. The process of claim 1 wherein the crystalline thermoplastic polyolefin polymer is a solid, high molecular weight, resinous plastic material made by polymerizing olefins selected from the group consisting of ethylene, propylene, butene-1, pentene-1 and 4-methylpentene.

18. The process of claim 1 wherein the crystalline thermoplastic polyolefin polymer is selected from the group consisting of low density polyethylene, medium density polyethylene, high density polyethylene, polypropylene and block copolymers of ethylene and propylene.

19. The process of claim 1 wherein the crystalline thermoplastic polyolefin polymer is high density polyethylene or polypropylene.

20. A process for preparing a thermoplastic elastomer material from a blend of an amorphous chlorinated polyethylene and a crystalline thermoplastic polyolefin polymer, the process comprising:
   a. forming a heat-plastified, substantially uniform admixture comprising an amorphous chlorinated polyethylene, a plasticizing material compatible with the chlorinated polyethylene, a crystalline thermoplastic polyolefin polymer and an inorganic base;
   b. dispersing a vulcanizing material for the chlorinated polyethylene throughout the admixture while mixing said admixture at a temperature sufficient to activate the vulcanizing material without substantially degrading any component of the composition and for a period of time sufficient to partially cure the chlorinated polyethylene, the vulcanizing material comprising (1) a derivative of 2,5-dimercapto-1,3,4-thiadiazole or (2) 2,5-dimercapto-1,3,4-thiadiazole and an activator material; and
   c. completing vulcanization of the chlorinated polyethylene via static curing.

* * * * *

UNITED STATES PATENT AND TRADEMARK OFFICE
CERTIFICATE OF CORRECTION

PATENT NO.  : 4,978,716

DATED       : December 18, 1990

INVENTOR(S) : James H. Flynn, Oliver C. Ainsworth and Robert R. Blanchard

It is certified that error appears in the above-identified patent and that said Letters Patent is hereby corrected as shown below:

Column 24, Claim 20, line 11, insert -- having a tension set value at 100% elongation of less than about 50% -- between "material" and "from".

Signed and Sealed this

Tenth Day of November, 1992

Attest:

DOUGLAS B. COMER

Attesting Officer

Acting Commissioner of Patents and Trademarks